Oct. 13, 1970   J. H. G. OLLIER   3,533,215
PACKAGING MACHINE
Filed Nov. 5, 1968
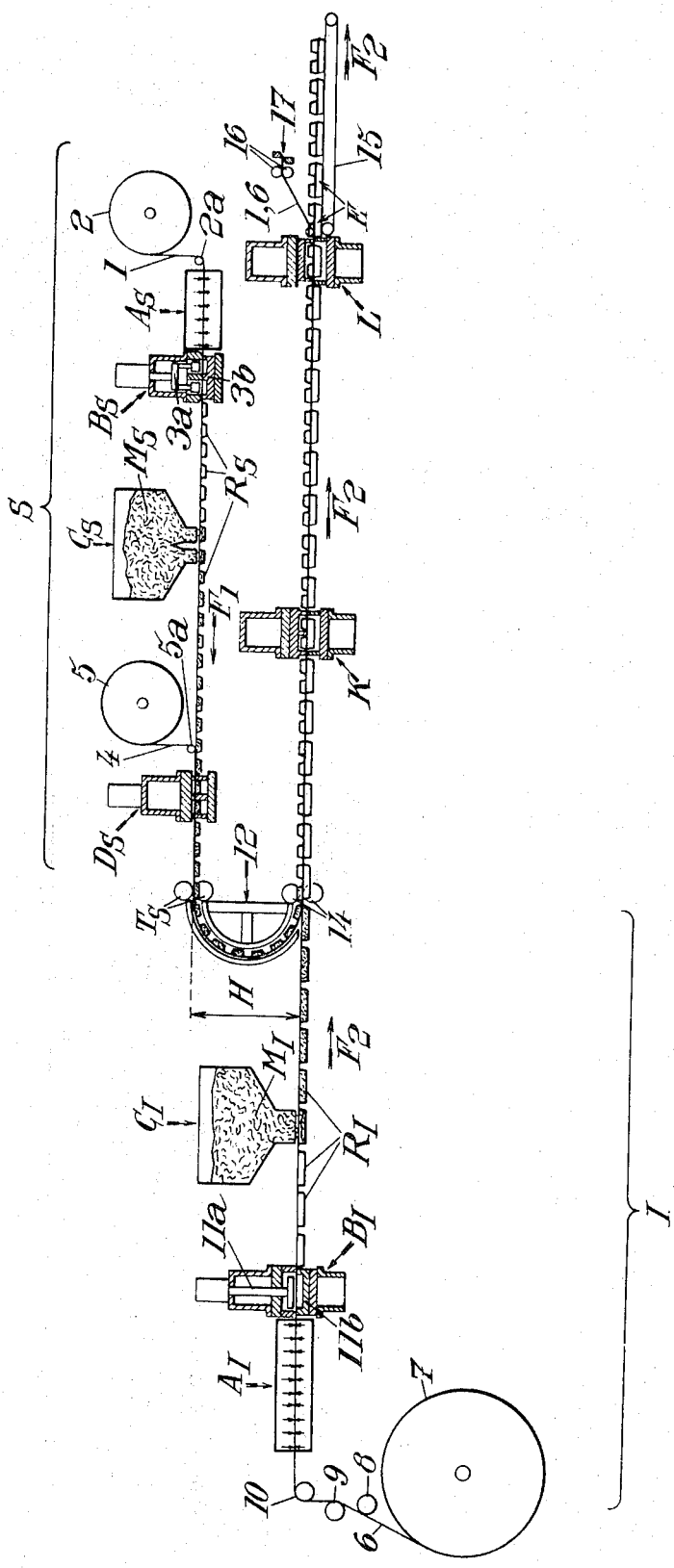

United States Patent Office 3,533,215
Patented Oct. 13, 1970

3,533,215
PACKAGING MACHINE
Jacques Honore Gaspard Ollier, Neuilly-sur-Seine,
France, assignor to Societe d'Application Plastique,
Mecanique et Electronique, Falaise, France
Filed Nov. 5, 1968, Ser. No. 773,438
Claims priority, application France, Nov. 6, 1967,
127,061
Int. Cl. B65b 9/04
U.S. Cl. 53—184                                  5 Claims

ABSTRACT OF THE DISCLOSURE

This machine manufactures packages having several separate compartments. The machine comprises means for manufacturing an upper chain of containers and means for manufacturing a lower chain of containers. A semi-circular guide is provided for bringing the containers of the upper chain into superposition on the containers of the lower chain. The upper and lower containers are then welded together by their edges, after which the finished packages are cut out.

---

This invention relates to a packaging machine.

In practice, the problem exists of packaging several different products which are intended to be used at the same time, but which, until the moment of their use, must remain separated from each other, and consequently, be contained in separate compartments of the same package.

It is of course possible to envisage the manufacture of packages comprising several compartments disposed beside one another in the same plane, but this solution is only of limited interest because of the problems which are then posed concerning the rigidity of the ensemble of the package.

An object of this invention is to mitigate these disadvantages and to provide a solution to the problem posed.

The machine according to the invention is characterized in that it comprises two work ensembles, namely an upper ensemble and a lower ensemble, forming, in two superimposed planes, two parallel work paths of opposite directions, each of these ensembles being adapted to manufacture containers having one or several compartments disposed beside one another, these containers having dimensions such that their respective upper faces can be superimposed, at least the containers coming from the upper ensemble being closed, means being provided to make the containers of the upper ensemble travel along a trajectory which brings each of them to be superimposed by its upper face on the upper face of a container coming from the lower ensemble, the work paths of the two ensembles then being coincident, the common path comprising at least one welding station capable of welding the pairs of upper and lower containers together by the peripheral edges of their upper faces.

The invention will be able to be well understood from the following complementary description and from the accompanying drawings, which complementary description and drawing are given merely by way of example.

In this drawing, the single figure is a schematic view showing the various parts of an embodiment of a machine according to the invention.

In this figure, the upper and lower ensembles, respectively designated by S and I, are situated in two horizontal planes spaced apart by a distance H and comprised between two vertical planes spaced apart by a distance equal to the transverse dimension of these ensembles.

As shown schematically, the upper ensemble comprises successively:

A heating station $A_S$, adapted to bring to a temperature sufficient for forming, a band 1 of thermoplastic material, taken from a roll 2 and guided towards the heating station by a pulley 2a, A forming station $B_S$ which, in the embodiment represented, comprises a double punch 3a cooperating with a double die 3b, and which is capable of forming, in each work cycle, two containers $R_S$, A filling station $C_S$ capable of filling, at each work cycle, two containers $R_S$, with a substance $M_S$, A welding station $D_S$ capable of closing at each work cycle two successive containers $R_S$ by welding of a cover which, in fact, is constituted by the successive parts of a band 4, for example of self-sticking aluminum, which is taken continuously from a roll 5 and brought to the level of the band 1 due to a roller 5a, A traction mechanism comprising rollers $T_S$ which act on the two edges of the band 1 (screens being provided at the interior of the station $A_S$ so that these edges are not heated, and consequently are not softened, over their entire width) in order to advance the band in a stepwise manner, at a speed and with a step which are adjustable with considerable precision.

Between the roll 2 and the station $D_S$, the band 1 consequently advances in the direction of the arrow $F_1$.

The lower ensemble comprises:

A heating station $A_I$, adapted to bring to a temperature sufficient for forming, a band 6 of thermoplastic material taken continuously off a roll 7 and guided towards the station $A_I$ by an ensemble of pulleys 8, 9, 10 (the station $A_I$ comprises, just like the station $A_S$, screens avoiding the heating, hence the softening, of the entire width of the edges of the band 6), A forming station $B_I$ which, in the embodiment represented, comprises a single punch 11a cooperating with a die 11b, and which is capable of forming at each work cycle a container $R_I$, A filling station $C_I$, capable of filling a container $R_I$ at each work cycle with a substance $M_I$.

The progression of the band 6 is in the direction of the arrow $F_2$.

The ensemble constituted by two containers $R_S$ is superimposable by its upper peripheral edge on the upper periperal edge of a single container $R_I$.

In order to make the containers $R_S$ travel, from the output of the station $D_S$, along a trajectory which leads each of them to be superimposed by its upper peripheral edge on the upper peripheral edge of a container $R_I$, the chain formed by the succession of containers $R_S$ is passed from the output of the station $D_S$ along a guide 12 in the form of a semicircle, of diameter vertical and equal to H, and centering means (known in themselves) are provided for adjusting the relative positions of the chains of upper and lower containers. These centering means can comprise centering rollers 14, for example adapted to join together the upper band and the lower band by placing the male part of hollow deformations comprised by one of the bands (and obtained in the softened part of the edge of the band by means of punches comprised by the forming station) in the female part of analogous deformations comprised by the other band and obtained in an analogous manner.

From the semi-circular guide 12, the ensembles formed of two containers $R_S$ and of one container $R_I$ progress in the plane of the band 6 in the direction of the arrow $F_2$ towards a welding station K capable of welding the upper peripheral edge of the container $R_I$ to the upper peripheral edge (facing downwards) common to the two associated containers $R_S$. The packages E thus formed are cut out in a cutting out station L, then disposed, with the aid of means of the ejecting and supporting type (known in themselves but not shown), on a conveyor belt 15.

Needless to say, it is also possible to evacuate the finished packages by an evacuation chute.

The progression of the chain of containers formed from the band 6 and the progression of the chain constituted by the packages resulting from the welding together of the containers $R_S$ and the containers $R_I$, are ensured, in the embodiment represented, by a known stepwise traction mechanism, illustrated by two rollers 16 which act on the edges of the single band resulting from the welding of the bands 1 and 6, and capable of advancing, at each step, the two chains which have just been defined by a length equal to the length of one container $R_I$ or of two containers $R_S$.

At the moment of adjusting the machine, one acts on the roller mechanism $T_S$ for synchronizing the advance of the band 1 with the advance of the band 6 (and of the single band resulting from the bands 1 and 6) which is obtained by means of the traction mechanism including the rollers 16.

Advantageously, from the output of the traction mechanism, the two bands welded together can be directed, after cutting out, towards a chopping device 17.

With regard to the particular constitution of the tools carried by the various work stations which have just been indicated, they can be realized in the manner described in French Patent No. 1,180,058 of June 29, 1957 (U.S. Pat. No. 3,000,157).

In order to be able to adjust the respective positions of the tools carried by the various work stations of each ensemble, either these stations can be mounted on at least two parallel bars (not shown) in the manner described in the above-mentioned French patent, or the stations can be given invariable respective positions, in which case these stations comprise means for permitting the adjustment of the position on the work path of the tools comprised by these stations, as described in French Pat. No. 1,509,024 of Nov. 24, 1966.

Packaging machines in accordance with this invention present numerous advantages with respect to machines of this type which are already in existence, in particular the advantage of permitting the manufacure, by means of a single machine, of packages having several compartments intended to contain materials which must be kept separate until the moment of their use.

Although the invention has been described with specific reference to a particular embodiment, it is clear that the invention should not be limited to that embodiment, since various changes and modifications are possible without departing from the spirit or scope of this invention.

What is claimed is:
1. A packaging machine, which comprises two ensembles of work stations, namely an upper ensemble and a lower ensemble, forming, in two superimposed planes, two parallel work paths of opposite directions, each of these ensembles being adapted to manufacture a chain of containers, each container having at least one compartment, these containers having dimensions such that their respective upper faces can be superimposed, at least the upper ensemble including closing means for closing the containers coming from the upper ensemble, means being provided for making the containers of the upper ensemble travel along a trajectory which brings each of them to be superimposed by its upper face on the upper face of a container coming from the lower ensemble the work paths of the two ensembles then being coincident, the common path comprising at least one welding station for welding the pairs of upper and lower containers together by the peripheral edges of their upper faces.

2. A machine according to claim 1, wherein at least one of said two ensembles is adapted to manufacture a chain of containers each of which containers has a plurality of separate compartments disposed beside one another.

3. A machine according to claim 1, wherein the means for making the containers of the upper ensemble travel along said trajectory which brings each of them to be superimposed by its upper face on the upper face of a container coming from the lower ensemble, comprise a guide in the form of a semi-circle, of diameter vertical and equal to the distance separating the two work paths.

4. A machine according to claim 3, which comprises centering means adapted to adjust the relative positions of the chain of containers coming from the upper ensemble and of the chain of containers coming from the lower ensemble.

5. A machine according to claim 4, wherein said centering means comprise centering rollers.

References Cited
UNITED STATES PATENTS

| | | | |
|---|---|---|---|
| 2,472,440 | 6/1949 | Salfisberg | 53—14 X |
| 3,182,791 | 5/1965 | Jenner | 206—56 |

TRAVIS S. McGEHEE, Primary Examiner

E. F. DESMOND, Assistant Examiner

U.S. Cl. X.R.

53—282